United States Patent

Persinger et al.

[15] 3,667,449
[45] June 6, 1972

[54] GAS-OPERATED BARBECUE GRILL

[72] Inventors: Laverne O. Persinger, Burbank; Merle L. Persinger, Glendale, both of Calif.

[73] Assignee: Big Boy Manufacturing Co., Inc., Burbank, Calif.

[22] Filed: Sept. 8, 1970

[21] Appl. No.: 70,263

[52] U.S. Cl. ............................................ 126/41 R, 126/25 R
[51] Int. Cl. ...................................... A47j 37/00, F24c 3/00
[58] Field of Search .................................... 126/41, 25, 25 A

[56] References Cited

UNITED STATES PATENTS

| | | | |
|---|---|---|---|
| 3,386,432 | 6/1968 | Hanson | 126/41 |
| 2,898,846 | 8/1959 | Del Francia | 126/41 X |
| 3,348,472 | 10/1967 | Anetsberger et al. | 126/41 X |
| 3,513,822 | 5/1970 | Korngold | 126/41 X |

*Primary Examiner*—Charles J. Myhre
*Attorney*—Fulwider, Patton, Rieber, Lee & Utecht

[57] ABSTRACT

A barbecue grill having a gas burner mounted within a firebowl which is supported above a base by a tubular column. The burner directs flames horizontally into the firebowl and is shielded against fouling by grease drippings from the cooking surface. Pumiceous rock is carried in the firebowl and is heated by the burner flames to re-radiate heat to the cooking surface. A ceramic-coated metal deflector can be provided over the burner to protect the burner and deflect the burner flames downwardly towards the firebowl bottom for heating the pumiceous rock so that the cooking surface is uniformly heated by both direct and radiant heat.

13 Claims, 4 Drawing Figures

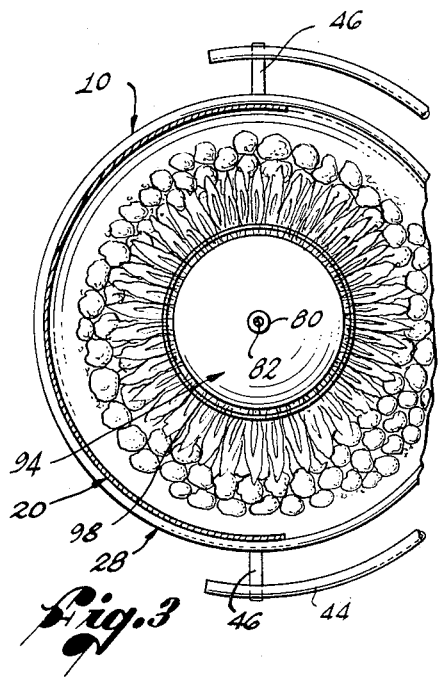
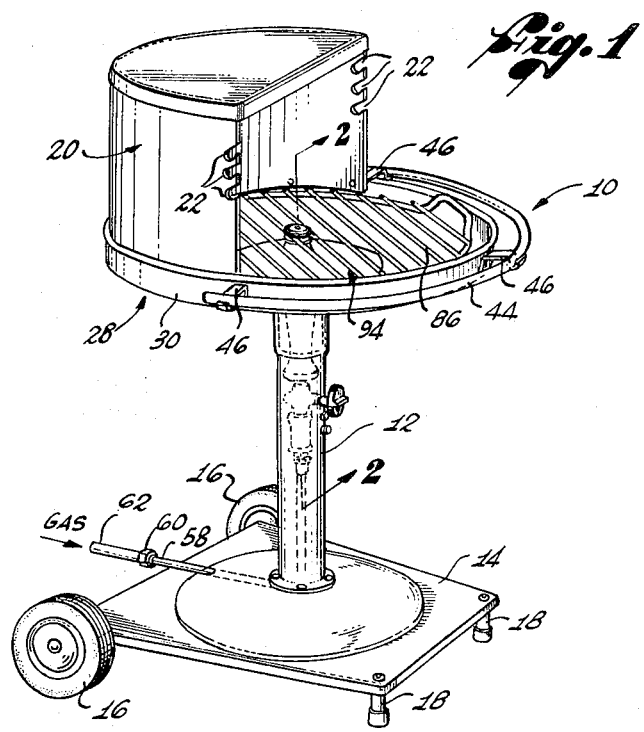
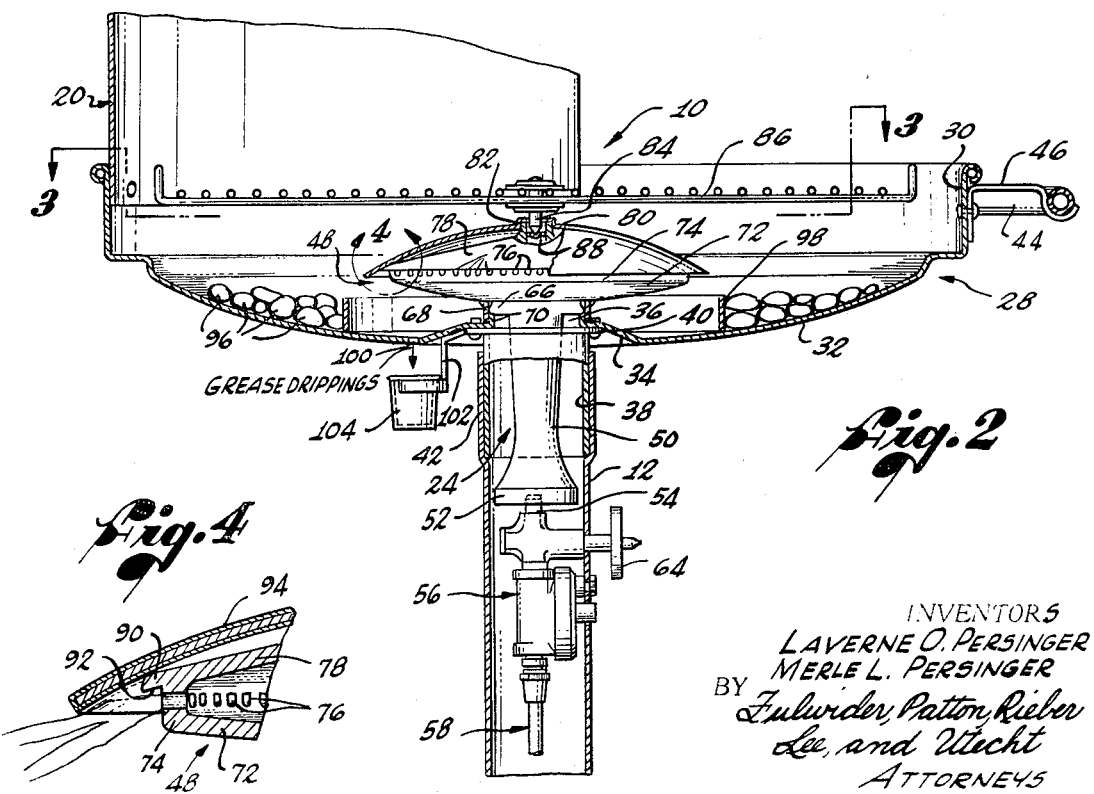
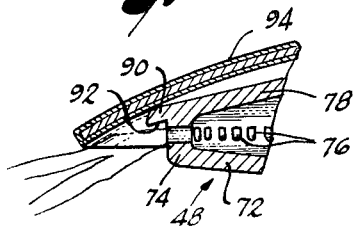
INVENTORS
LAVERNE O. PERSINGER
MERLE L. PERSINGER
BY Fulwider, Patton, Rieber
Lee, and Utecht
ATTORNEYS

GAS-OPERATED BARBECUE GRILL

BACKGROUND OF THE INVENTION

This invention relates to barbecue grills and more particularly to a new and improved barbecue grill of the type adapted to burn gas from an external pressurized supply.

Numerous types of barbecue grills are presently available which burn gas from an external pressurized source or supply. However, most gas-operated barbecues require substantial upkeep and periodic maintenance to prevent fouling resulting from the buildup of grease and other residue in the area of the burner. Further, many such barbecues are quite heavy and must be permanently mounted, and thus do not readily lend themselves to movement or transportation. Barbecues of this type must be left exposed to the elements and consequently must be covered when not in use and must be frequently maintained and cleaned to prevent rust and other weather-caused deterioration.

An additional problem which has been encountered with some gas-operated barbecues is that of inefficient heating of the cooking area. Most gas-fired barbecues use the burner to heat pumiceous rock or other similar material which in turn heat the cooking area by re-radiation. With this arrangement, a substantial start-up time is required before the barbecue can be used for cooking purposes. Further, this arrangement requires that the burner be placed in an inaccessible position below the re-radiating material, thus tending to increase the possibility and frequency of burner fouling and making maintenance of the burner difficult.

SUMMARY OF THE INVENTION

The present invention provides a gas-operated barbecue which is low in cost of manufacture, efficient and reliable in operation and long-lasting and trouble-free in use.

The barbecue employs a burner which is mounted centrally with a firebowl and above the bottom of the firebowl so that efficient and uniform heating of the cooking area can be attained. The burner is shielded against fouling by grease and residue and eliminates the necessity for frequent maintenance and upkeep.

The barbecue cooling surface is uniformly and efficiently heated by direct heat from the burner and by radiation from pumice rock carried in the firebowl. The barbecue burner directs flames horizontally into the firebowl, and a dome-shaped deflector can be placed over the burner to deflect the horizontal flames downwardly towards the firebowl bottom to heat the pumice rock.

DESCRIPTION OF THE DRAWINGS

FIG. 1 is a perspective view of the gas-operated barbecue grill of the present invention;

FIG. 2 is a fragmentary sectional view, with portions cutaway, of the barbecue of FIG. 1, taken substantially in the direction of line 2—2 of FIG. 1;

FIG. 3 is a fragmentary top plan view taken in the direction of the line 3—3 of FIG. 2; and FIG. 4 is an enlarged fragmentary section view taken in the area of circle 4 of FIG. 2.

DETAILED DESCRIPTION

As illustrated in the drawings, the present invention is emboided in a new and improved gas-operated barbecue grill 10 of the type primarily intended for outdoor cooking use. In this instance, the barbecue 10 is supported by a cylindrical column 12 which extends upwardly from a metal base 14. Preferably, the base 14 has a pair of rear wheels 16 which enables the barbecue 10 to be easily moved, and a pair of short legs 18 are bolted to the front of the base to stabilize the barbecue when in use.

A suitable hood 20 can also be provided over the barbecue 10 to serve as a windbreak and heat reflector. Herein, the hood 20 has a generally semi-circular configuration and is bolted to the barbecue 10 in such a manner that the hood encloses approximately one-half of the cooking area. A series of notches 22 are formed in the front of the hood 20 to support a conventional rotisserie (not shown).

In accordance with the present invention, the barbecue 10 is low in cost of manufacture, highly reliable and efficient in operation, and is long-lasting and trouble-free in use. Toward these ends, the barbecue 10 employs a shielded burner 24 which is mounted centrally within a firebowl 28 which has a generally circular horizontal cross-section, the burner directing flames horizontally into the firebowl for substantially uniform heating of the cooking surface.

As best seen in FIGS. 1 and 2, the firebowl 28 has an upper cylindrical sidewall 30 projecting from an inverted, generally dome-shaped bottom wall 32 which has a raised central section 34. A generally cylindrical sleeve 38 having an upper radial flange 40 bolted to the underside of the bottom wall 32 supports the firebowl 28 above the top of the column 12. The sleeve 38 supports the firebowl 28 for rotation relative to the base 14 and is rotatably received within an enlarged diameter cylindrical section 42 formed in the upper end of the column 12.

Surrounding a portion of the sidewall 30 of the firebowl 28 is a tubular rail 44 which is secured to three brackets 46 bolted to the outside of the sidewall. When the barbecue 10 is in use, the rail 44 serves as a means for turning the firebowl 28 about the column 12 so that the position of the hood 20 can be adjusted relative to the wind conditions for more effective shielding of the cooking surface.

The burner 24, which herein has a generally circular horizontal cross-section and is preferably formed of cast iron, has a generally T-shaped vertical cross-section with a generally horizontal upper portion 48 extending upwardly and outwardly from a tubular base leg 50 which projects downwardly through a circular opening 36 formed through the center of the raised section 34 of the firebowl 28. The base leg 50 extends into the upper end of the column 12 and has an enlarged diameter lower end 52 which overlies and surrounds the open end of a short gas pipe 54 to form a mixing chamber, the gas pipe projecting from a suitable pressure regulator valve 56.

Pressurized gas, such as bottled L.P. gas or centrally supplied natural gas, is supplied to the regulator valve 56 through a gas conduit 58 extending donwardly through the column 12 to the rear of the base 14. Preferably, a suitable releasable coupling 60 is provided on the supply end of the gas conduit 58 so that the gas conduit can be releasably coupled with a supply line 62 from the gas source (not shown). When coupled with the gas source, the regulator valve 56 is used to control the amount of gas supplied to the burner 24, a suitable adjustment knob 64 being provided in the outside of the column 12 for this purpose.

Gas from the regulator valve 56 flows through the gas pipe 54 into the base leg 50 of the burner 24 and then upwardly into the burner upper portion 48. The burner 24 is supported centrally within the firebowl 28 by a radial shoulder 66 integrally formed around the top of the base leg 50 and the bottom of the upper burner portion 48, and by a cylindrical ring 68 which extends between the bottom of the burner upper portion and the firebowl.

The radial shoulder 66 rests on the upturned edge 70 of the firebowl 28 forming the circular opening 36 through the center of the raised section 34 to support the burner 24, and the ring 68 encircles the radial shoulder and upturned edge to both support and positively locate the burner centrally within the firebowl. By supporting the burner 24 in this manner, the burner can be easily assembled and readily removed for cleaning of the barbecue 10. Further, since the burner 24 is supported entirely by the firebowl 28, if the firebowl is rotated about the column 12, the burner will remain stationary relative to the firebowl.

The burner upper portion 48 has a lower, generally dish-shaped section 72 which extends upwardly and radially outwardly from the base leg 50 and radial shoulder 66 and terminates in a top cylindrical wall 74, as shown in FIG. 4. A series of individual gas ports 76 are spaced circumferentially around the cylindrical wall 74 and extend into the interior of the burner upper portion 48. Gas flowing into the burner upper portion 48 escapes through the ports 76 and, when ignited, produces flames which radiate horizontally outwardly around the burner 24, as illustrated in FIG. 3.

An upper, generally conical cap section 78 overlies the lower section 72 to form the full burner upper portion 48. An axial projection 80 extends a short distance above the top of the burner cap section 78 and has a cylindrical recess 82 within which an axial shaft 84 attached to a circular wire grill 86 is mounted. Herein, the recess 82 is formed as a through hole in the burner cap section 78 and a circular disc 88 is retained in the recess to serve as a stop for the grill shaft 84 and to prevent gas from leaking from the interior of the burner 24. The bottom of the grill shaft 84 is preferably pointed so that the grill 86 will be freely rotatable relative to the burner 24 and firebowl 28.

As best seen in FIG. 4, the burner cap section 78 terminates outwardly in a radial flange 90 which extends radially beyond the cylindrical wall 74 of the lower section 72, and has a slightly undercut lower surface 92. The radial flange 90 and undercut 92 any grease drippings from the cooking surface which may fall on the burner 24 from reaching the gas ports 76 before being consumed by the burner flames. Thus, the gas ports 76 cannot become fouled or blocked by grease or residue and therefore frequent cleaning of the burner 24 is not required, even when the burner has been in use for prolonged periods.

As best shown in FIGS. 2 and 4, a dome-shaped flame deflector 94 can be provided over the cap section 78 of the burner 24 to direct the horizontal flames from the burner downwardly towards the bottom wall 32 of the firebowl 28. In this instance, the deflector 94 also serves as a grease shield and makes it virtually impossible for grease drippings to reach the burner 24. The deflector 94, which is preferably formed from a ceramic-coated metal, projects radially beyond and below the radial lip 90 of the burner cap section 78 so that flames from the gas ports 76 will be deflected downwardly as they radiate from the burner 24.

Referring again primarily to FIGS. 2 and 3, the firebowl 28 contains a supply of pumice rock 96 which is heated by the deflected flames from the burner 24. The pumice 96 serves to re-radiate heat to the cooking surface and vaporize grease drippings to give a barbecue flavor to the cooked food. Herein, the pumice 96 is held away from the burner 24 by a retaining ring 98 secured to the bottom wall 32 of the firebowl 28.

Preferably, the diameter of the retaining ring 98 is larger than that of the deflector 94 and burner 24 so that any unconsumed grease drippings from the deflector 98, or from the radial flange 90 of the burner cap section 78 in the absence of the deflector, can be collected. For this purpose, a drain hole 100 is provided through the bottom wall 32 of the firebowl 28 adjacent the raised central section 34 and a grease cup holder 102 is secured to the underside of the firebowl to hold a grease cup 104 below the drainhole. Grease from the deflector 94 or burner 24 falling into the firebowl 28 is then collected in the grease cup 104, thereby maintaining the firebowl relatively clean.

By virtue of the placement and mounting of the burner 24 in the firebowl 28, uniform and efficient heating of the cooking surface is obtained, both by direct heat from the horizontal flames from the burner and by radiation from the pumice 96. Since the burner gas ports 76 are completely shielded, either with or without the deflector 94, against grease drippings and the residue of such drippings, the burner 24 requires little or no maintenace. Further, with the ceramic-coated deflector 94 overlying the burner 24, the burner is shielded against rain and weather, thus preventing the barbecue from being damaged even after long exposure to the elements.

From the foregoing, it should be evident that the barbecue 10 of this invention is highly reliable and efficient in operation and that it will withstand many years of use with little or no upkeep being required. As a result of the simplified construction, the barbecue 10 can be easily and quickly assembled and employs a minimum of parts and labor, thus substantially reducing the cost of manufacture.

While the above description has been directed to the presently preferred embodiment of the invention wherein the firebowl 28, burner 24 and grill 86 have a circular shape, it will be appreciated that other shapes may be employed as well. Further, it should be appreciated that various changes and modifications in the described embodiment can be made without departing from the spirit and scope of the novel features of the invention. Accordingly, it is not intended that the invention be limited, except as by the appended claims.

We claim:
1. A gas-operated barbecue grill comprising:
    a generally circular firebowl having a bottom and an open top;
    a burner having a generally circular cross-section mounted centrally within said firebowl, and projecting above said bottom, said burner carrying a series of gas ports which direct flames horizontally into said firebowl;
    a grease shield extending horizontally outwardly of said gas ports;
    means for supplying gas to said burner;
    and a circular wire grill centrally supported above said burner and positioned adjacent said open top, said grill being rotatable relative to said firebowl.
2. A gas-operated barbecue grill as defined in claim 1 wherein:
    said burner includes a lower section carrying said gas ports and an upper section overlying said lower section, said upper section including a flange defining said grease shield.
3. A gas-operated barbecue grill as defined in claim 1 wherein:
    said grease shield comprises a deflector overlying said burner, said deflector being dimensioned in such a manner that the outer edge projects both horizontally outwardly and vertically below said gas ports whereby the flames from said gas ports are deflected downwardly by said deflector;
    and a plurality of pumicious rock are carried in said firebowl bottom, said rock being heated by the deflected flames thereby to radiate heat toward said open top.
4. A gas-operated barbecue grill as defined in claim 3 wherein:
    said burner includes a dish-shaped lower section carrying said gas ports and a generally conical cap section overlying said lower section;
    and said deflector is generally circular and dome-shaped and is supported centrally by said burner cap section.
5. A barbecue grill of the type adapted to burn gas from an external pressurized supply, said barbecue grill comprising:
    a generally circular firebowl having a bottom, a side and an open top;
    a shielded circular burner carrying a series of radial gas ports supported centrally within said firebowl and concentric therewith;
    a circular wire grill centrally supported by said burner adjacent said open end;
    and means for coupling said burner with the external gas supply.
6. A barbecue grill as defined in claim 5 wherein:
    said burner comprises a lower dish-shaped section carrying said gas ports, and an upper generally conical cap section overlying said lower section, said cap section including a radial flange projecting beyond said gas ports thereby forming a grease shield for said gas ports.
7. A barbecue grill as defined in claim 6 further including:

a generally dome-shaped deflector centrally supported by said burner cap section, said deflector overlying said burner and projecting radially beyond said radial flange in such a manner that said deflector forms a grease shield for said gas ports and also deflects flames from said gas ports downwardly towards said firebowl bottom.

8. A barbecue grill as defined in claim 7 wherein:
said deflector is formed from a ceramic-coated metal;
and a plurality of pumiceous rock are carried in said firebowl bottom.

9. A barbecue grill as defined in claim 5 further comprising:
a cylindrical ring concentrically mounted within said firebowl bottom, the diameter of said ring being greater than the diameter of said shielded burner;
a drain hole through said firebowl bottom between said ring and said burner whereby grease dripping from said burner is collected within said firebowl bottom between said ring and said burner and is drained from said firebowl through said hole;
and a plurality of pumicious rock are carried in said firebowl bottom between said side and said ring, said rock serving to radiate heat from said burner toward said open top.

10. A barbecue grill as defined in claim 9 still further comprising:
a cup holder attached to said firebowl bottom and extending downwardly therefrom adjacent said hole;
and a cup carried by a holder whereby grease drained from said firebowl through said hole is collected in said cup.

11. A barbecue grill as defined in claim 5 further comprising:
a hood attached to said firebowl side and extending above said open top in such a manner that approximately one-half of said open top is enclosed;
and a base having a tubular column extending upwardly therefrom, said column being attached to said firebowl bottom in such a manner that said firebowl is rotatable relative to said column and base.

12. In a barbecue grill of the type having a gas burner adapted to burn gas from an external pressurized supply, the improvement comprising:
a burner having a generally circular horizontal cross-section including:
a generally tubular base portion having an enlarged bottom and a top;
an upper portion attached to the top of said base portion, said upper portion comprising:
a generally dish-shaped lower section extending radially outwardly of said base portion;
a cylindrical wall projecting upwardly from the outer edge of said lower section and carrying a plurality of individual gas ports spaced circumferentially around said cylindrical wall;
and a generally conical upper section overlying said lower section, said upper section including a radial flange extending radially beyond said cylindrical wall whereby said flange shields said gas ports from grease dropping on said upper section.

13. The improvement as defined in claim 12 further comprising:
a dome-shaped deflector overlying said upper section, said deflector extending radially beyond said flange and below said gas ports whereby radial flames from said gas ports are deflected downwardly by said deflector.

* * * * *

PO-1050
(5/69)

UNITED STATES PATENT OFFICE
CERTIFICATE OF CORRECTION

Patent No. 3,667,449              Dated June 6, 1972

Inventor(s) Laverne O. Persinger et al.

It is certified that error appears in the above-identified patent and that said Letters Patent are hereby corrected as shown below:

COLUMN 1, line 59, change "section" to --sectional--.

COLUMN 3, line 26, after "undercut" insert --lower surface--; same line, after "92" insert --prevent--.

Signed and sealed this 29th day of August 1972.

(SEAL)
Attest:

EDWARD M. FLETCHER, JR.
Attesting Officer

ROBERT GOTTSCHALK
Commissioner of Patents